(12) United States Patent  (10) Patent No.: US 7,374,221 B2
McClure et al.  (45) Date of Patent: May 20, 2008

(54) CARGO LID ANCHOR CABLE

(75) Inventors: Kerry S. McClure, Dublin, OH (US);
John E. Werling, Dublin, OH (US);
Matthew W. Seman, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 152 days.

(21) Appl. No.: 11/272,388

(22) Filed: Nov. 10, 2005

(65) Prior Publication Data

US 2006/0108826 A1 May 25, 2006

Related U.S. Application Data

(60) Provisional application No. 60/627,357, filed on Nov. 12, 2004.

(51) Int. Cl.
*B60R 9/06* (2006.01)

(52) U.S. Cl. ............... 296/37.6; 296/37.14; 296/146.1

(58) Field of Classification Search .............. 296/37.6, 296/37.14, 146.1, 37.1; 49/141, 325
See application file for complete search history.

(56) References Cited

U.S. PATENT DOCUMENTS

| | | | |
|---|---|---|---|
| 3,893,207 A * | 7/1975 | Rudaitis et al. .......... 180/69.21 |
| 3,940,009 A | 2/1976 | Szeles | |
| 5,183,307 A | 2/1993 | Chiu, Jr. | |
| 5,221,121 A | 6/1993 | Zichner et al. | |
| 5,615,922 A | 4/1997 | Blanchard | |
| 6,059,341 A | 5/2000 | Jensen et al. | |
| 6,155,625 A | 12/2000 | Felix | |
| 6,267,427 B1 | 7/2001 | Ziehl | |
| 6,474,725 B2 | 11/2002 | Sotiroff et al. | |
| 6,763,985 B1 | 7/2004 | Stephenson, Sr. et al. | |
| 6,876,531 B2 * | 4/2005 | Nakazawa et al. ............ 361/92 |
| 6,880,875 B2 * | 4/2005 | McClure et al. ......... 296/37.14 |
| 6,883,851 B2 * | 4/2005 | McClure et al. ......... 296/37.14 |

* cited by examiner

*Primary Examiner*—Dennis H Pedder
*Assistant Examiner*—Melissa A Black
(74) *Attorney, Agent, or Firm*—Mark E. Duell; Fay Sharpe LLP

(57) ABSTRACT

A retention cable arrangement for retaining a cargo closure assembly in association with a storage compartment of a vehicle includes a cargo lid door having at least one hinge for pivotally connecting the cargo door to the vehicle. A retention cable is connected to the at least one hinge and to the cargo door distal to the at least one hinge.

21 Claims, 4 Drawing Sheets

CARGO LID ANCHOR CABLE

This application claims priority of Provisional Patent Application Ser. No. 60/627,357, filed Nov. 12, 2004, entitled "Cargo Lid Anchor Cable".

BACKGROUND

The present disclosure relates generally to an anchor or retention cable assembly for retaining a cargo lid door or closure to a vehicle and, more particularly, to a cargo lid anchor or retention cable assembly provided on a cargo lid of a built-in storage compartment in the floor of a sport utility or pickup truck type vehicle. In one embodiment, the cargo lid anchor cable assembly has a cable connected to the closure which is substantially co-planar thereto for retaining the closure in the event of failure of a hinged connection between the closure and the vehicle.

Various types of storage compartments and enclosures have previously been devised for meeting the requirements of particular applications. For example, previous solutions to storage problems in vehicles include trunks, cargo beds, cargo areas, etc. Pickup trucks typically provide a relatively large open storage area for the vehicle size and are thus often the vehicle of choice for people who must haul considerable amounts of cargo. Hence, pickup trucks are relatively popular with construction workers, farmers and others who require vehicles with cargo carrying capabilities. However, a significant disadvantage to previous pickup trucks is that they provide relatively little storage space that is securable and protectable, and also conveniently located.

Various solutions have heretofore been proposed to compensate for insufficient storage space in pickup trucks. For example, tool boxes are available for mounting transversely across the beds of pickup trucks for access from either side. Shells and caps, typically installed as after-market items, are also available which form enclosures over the pickup truck beds. However, all of these solutions have disadvantages, which include expense, inconvenience, customized installation, and functional and space compromises. Additionally, any mounted accessories, as described above, can result in a potential danger in that component parts can become dislodged. Dislodging of the component parts can occur as the result of normal wear and tear and/or due to a violent crash which can separate one component from another (i.e. separating a lid from a box or compartment mounted to or within the open bed of a pickup truck).

Typical connections between a door and an associated storage box can include a chain or tether therebetween. The chain acts as a stop to the range of rotation or travel thereby limiting the amount of rotation the lid can enjoy relative to the box. The chains in these mounting arrangements are insufficient and not adapted to retain the lid should the hinges between the lid and box become separated. The chains, as described, are typically on one side and thus, are not capable of restricting a wide range of motion (travel) imparted to the lid, particularly during a violent crash or other high stress situations.

The storage system of the exemplary embodiment addresses the problems of limited storage in pickup trucks and sport utility vehicles, which tend to have relatively limited enclosed storage space. Heretofore there has not been available a vehicle storage system particularly suitable for pickup trucks or sport utility vehicles with the advantages and features of a cargo lid retention mechanism as hereinafter described.

SUMMARY

In accordance with one aspect, a retention cable arrangement is provided for retaining a cargo lid door in association with a storage compartment of a vehicle. More particularly, in accordance with this aspect, the retention cable arrangement includes a cargo lid door having at least one hinge for pivotally connecting the cargo door to the vehicle. A retention cable is connected to the at least one hinge and to the cargo lid door distal to the at least one hinge.

In accordance with another aspect, a mounting arrangement is provided for a retention cable in association with a vehicle. More particularly, in accordance with this aspect, the mounting arrangement includes a closure having a hinge for connecting the closure to the vehicle. A retention cable is connected to the hinge and to the closure at a location spaced from the hinge. The retention cable is substantially co-planar with the closure.

In accordance with yet another aspect, a closure retention arrangement is provided for a vehicle closure. More particularly, in accordance with this aspect, the closure retention arrangement includes a closure having a hinged connection connecting the closure to a body of the vehicle. A cord is provided which is substantially co-planar with the closure. The cord includes a first connection to the hinged connection and a second connection to the closure. The second connection is spaced from the hinged connection.

In accordance with still another aspect, a closure retention arrangement is provided for a vehicle closure. More particularly, in accordance with this aspect, the closure retention arrangement includes a closure having a connection to a body of the vehicle. A cord is provided which is substantially co-planar with the closure. The cord includes a first attachment to the connection and a second attachment to the closure. The second attachment is spaced from the first attachment.

DETAILED DESCRIPTION

Figure 1:
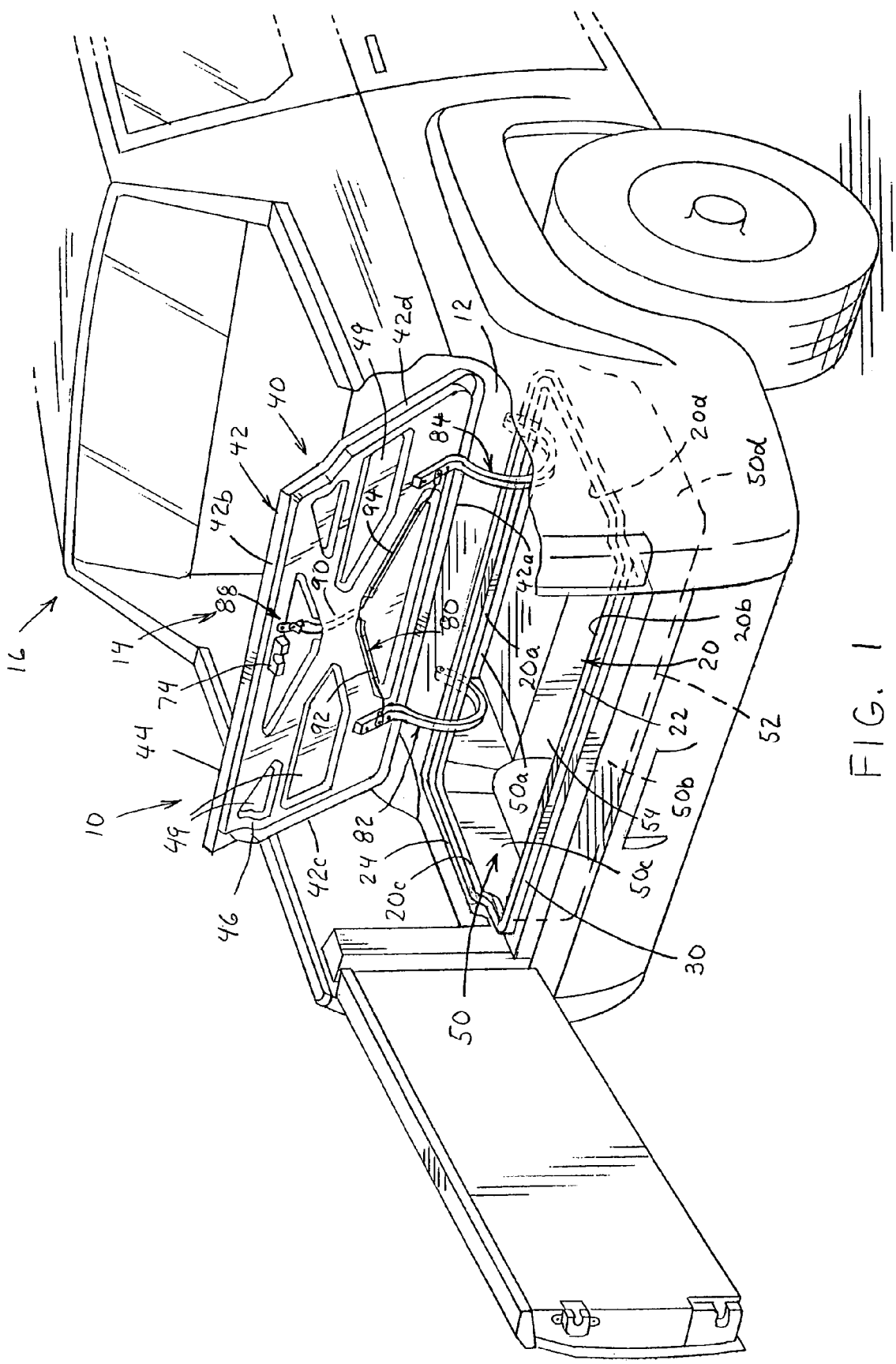
FIG. 1 is a partial rear side perspective view of a pickup truck with a storage compartment and a closure retention arrangement.

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring now to the drawings wherein the showings are for purposes of illustrating one or more embodiments only and not for purposes of limiting the same, the reference numeral 10 generally indicates a storage system. The storage system 10 is adapted for mounting in the floor 12 of a bed 14 of a vehicle 16 such as a pickup truck or sport utility vehicle. However, the storage system 10 can also be adapted to other applications, including different vehicles.

With reference to FIG. 1, the bed 14 includes a generally rectangular storage compartment or opening 20 including front, back and opposite side edges 20a, 20b, 20c, and 20d together forming a rim 22. A channel 24 is formed around the rim 22 of the opening 20 and can include a plurality of drain holes and an inner, upwardly-extending flange (not illustrated). A gasket 30 can be mounted on the inner flange for weather sealing the storage system 10.

A cargo lid door or closure assembly 40 includes a lid or closure 42 (FIG. 2) with front, back, first side, and second side edges 42a, 42b, 42c, and 42d respectively. The closure can be made from any variety of thermoplastic, sheet molded compound, or the like. The closure 42 can include an outer shell 44 and an inner frame 46 defining a space 47 therebetween. The inner frame 46 can provide rigidity to the outer shell 44 and can include a plurality of openings 49 therethrough. A compartment 50 is mounted (e.g., welded) on the truck bed floor 12 beneath the opening 20 and includes front, back and opposite side walls 50a, 50b, 50c, and 50d respectively and a compartment floor 52. Alternatively, the compartment 50 can be formed integrally with the bed floor 12. The compartment 50 forms a compartment interior 54. The closure assembly 40 provides a lid 42 for selectively covering the opening 20. It is to be appreciated that the lid 42 and the compartment 50 are easily accessible from the rear of the vehicle 16 (FIG. 1).

A latch assembly can include a catch (not shown) mounted on the compartment back wall 50b in proximity to the floor opening 20 and a latch 74 engageable with the catch and mounted on the inner frame 46 in proximity to the lid back edge 42b. The latch 74 can be operable by a keyed lock accessible from the outer shell 44 and used to selectively open and close the closure assembly 40.

Figure 2:
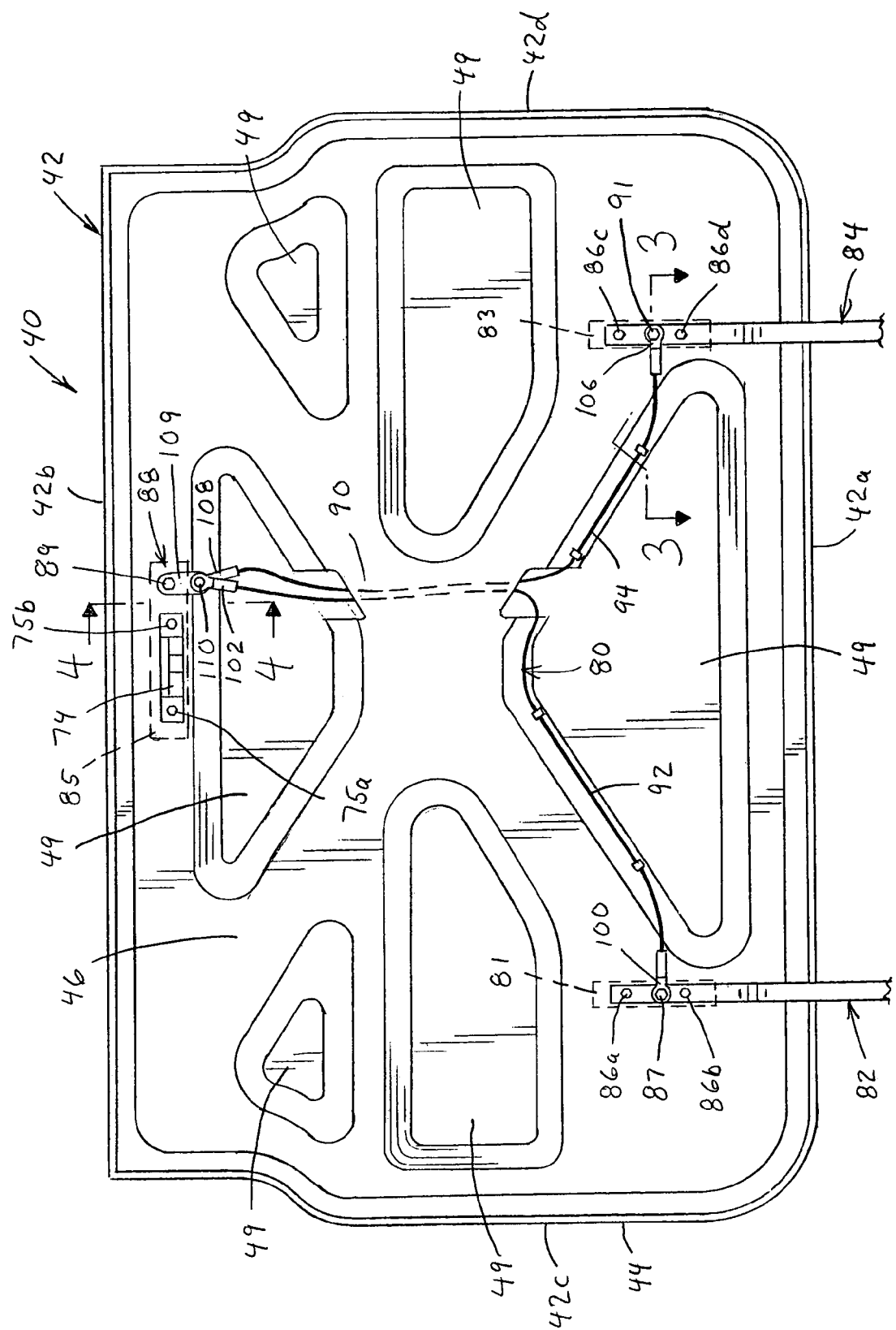
FIG. 2 is a plan view of the cargo lid door, particularly showing the closure retention arrangement.
Figure 3:
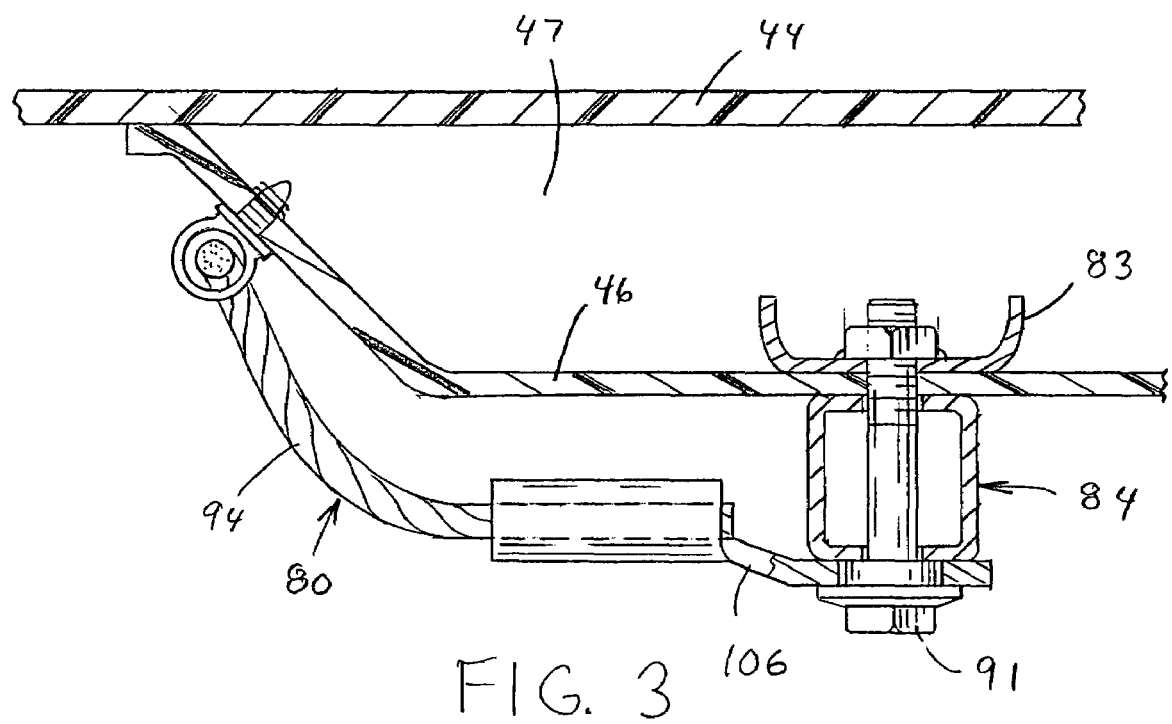
FIG. 3 is a cross-sectional view of a connection used with the closure retention arrangement, taken generally along line 3-3 in FIG. 2; and, FIG. 4 is a cross-sectional view of another connection used with the retention arrangement, take generally along line 4-4 in FIG. 2.
Figure 4:
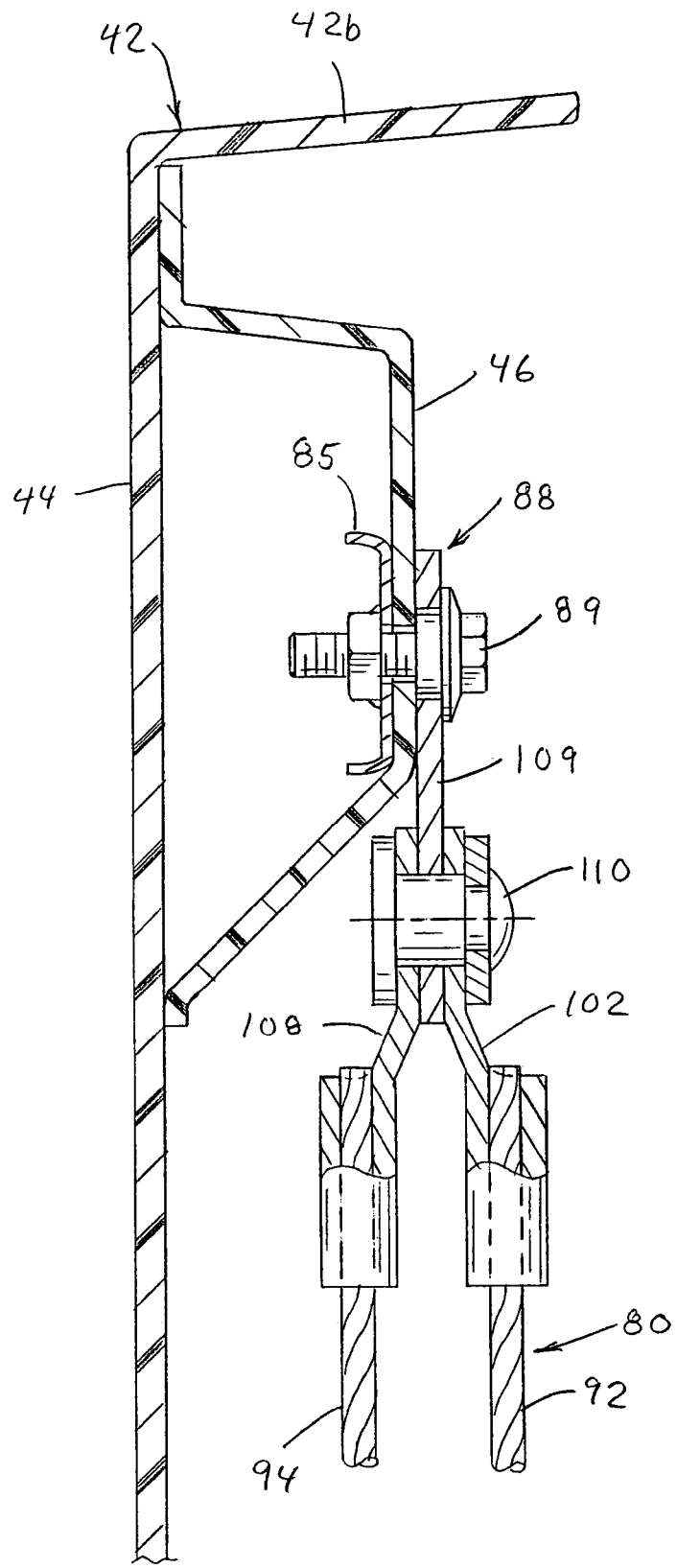

Referring now to FIGS. 2-4, a retention cable mounting arrangement is therein shown. The arrangement can include a retention or anchor cable 80 for the cargo lid door 42 for retaining the cargo lid door 42 to the vehicle 16 and will be described in more detail hereinafter. The cable 80 can include a bundle of strands having a minimum breaking strength of about 1200 kilograms per foot. It is to be appreciated that a cord, rope, wire, or similar can be used in place of a cable. The cargo lid door 42 can include a first hinge 82 and a second hinge 84 for pivotally connecting the cargo door 42 to the vehicle 16, for example, the vehicle bed 14. The hinges 82, 84 can be mounted on the truck bed floor 12 within the compartment interior 54 in proximity to the compartment front wall 50a.

The hinges 82, 84 mount the lid 42 in proximity to its front edge 42a and accommodate movement of the lid 42 between a closed position with the gasket 30 sealingly engaging the lid 42 adjacent to its edges 42a-42d around the lid inner frame 46 and an open position providing access to the compartment interior 54 through the truck bed floor opening 20. The hinges 82, 84 can be gooseneck-type hinges, spaced from one another, or any other type of hinge for connecting a door to a frame substantially co-planar thereto. Alternatively, the cargo lid door 42 can have only one hinge or other attachment fixtures for connecting the cargo door to the vehicle 16 (not illustrated).

In the illustrated embodiment, the first and second hinges 82, 84 each include a pair of fasteners 86a, 86b, 86c, and 86d for mounting the cargo lid door 42 to the hinges 82, 84. The cargo lid door 42 can include first and second reinforcement members 81, 83 between the inner frame 46 and the outer shell 44 to stiffen the fasteners 86a, 86b, 86c, and 86d connecting the hinges 82, 84 to the door 42. The cargo lid anchor cable 80 can be connected to the first hinge 82 (i.e. first attachment) and to the cargo door (i.e. second attachment) at a position 88 distal to the first hinge 82. Position 88 can be adjacent to the latch 74 or to the back edge 42b of the closure 42. The cargo lid door 42 can include a third reinforcement member 85 between the inner frame 46 and the outer shell 44 to stiffen fasteners 75a, 75b connecting the latch 74 to the door 42. The cable 80 can extend above and below the inner frame 46 between the first hinge 82 and position 88. In this arrangement, as best shown in FIG. 2, the cable 80 is 'weaved' around a section 90 of the inner frame 46 thereby limiting the amount of travel by the cargo lid door 42 in the event that the cargo lid door 42 becomes detached from the hinges 82, 84.

Additionally, the anchor cable 80 can be connected to the second hinge 84. In this arrangement, the anchor cable 80 can include a first portion 92 and a second portion 94. The first portion 92 of the anchor cable 80 can be connected at one end 100 to the first hinge 82 by a fastener 87, and at another end 102 to the cargo door 42 distal to the first hinge 82 by a fastener 89. The second portion 94 of the retention cable 80 can be connected at one end 106 by a fastener 91 to the second hinge 84 and at another end 108 to the cargo door 42 distal to the second hinge 84, i.e., at position 88. The cable connection ends 100, 102, 106, and 108 can include looped end connectors. The looped ends 102, 108 are connected to a support member 109 and a pivot member 110 between the ends 102, 108 and the fastener 89 thereby allowing pivotal movement between ends 102, 108 and inner frame 46. It is to be appreciated that the anchor cable 80, including first and second portions 92, 94, remains substantially co-planar with the cargo door 42 during closing and opening of the cargo door 42.

As described above, the anchor cable 80 can have connections 100, 106 to hinges 82, 84. In the illustrated embodiment, the connections 100, 106 are co-linear and adjacent to the front edge 42a of the cargo lid door 42 and the connections 102, 108 are adjacent to the back edge 42b of the cargo lid door 42.

In operation, the compartment interior 52 can be adapted for storing and securing a variety of items, while providing protection from the elements, without interfering with the normal operation of the vehicle bed 14. Any number of articles can be stored, for example, tools, recreational equipment, spare tire, road hazard equipment, etc. In the event that the cargo lid 42 becomes separated from the hinges 82, 84, due to a crash and/or wear and tear, the retention cable 80 will continue to secure the lid 42 to the vehicle 16 via the attachment of the cable 80 to the hinges 82, 84.

It is to be appreciated, that the attachments 100, 106 of the cable portions 92, 94 to the first and second hinges 82, 84, along with the attachments 102, 108 to the lid 42 distal to the hinges 82, 84, restricts unwanted, or inadvertent, movement of the lid 42 in the event the lid 42 becomes detached from the hinges 82, 84. Attachment of the cable 80 to the lid 42 proximal to the latch mechanism, along with the co-planar orientation of the cable 80 relative to the lid 42, provides for a free range of motion when the latch is disengaged and the cargo door lid 42 is hingedly rotated to the open position (FIG. 1).

The exemplary embodiment has been described with reference to the embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A retention cable arrangement for a cargo closure assembly in association with a storage compartment of a vehicle, comprising:
   a cargo lid door having at least one hinge for pivotally connecting said cargo door to the vehicle;
   a retention cable fixedly secured to said at least one hinge and to said cargo lid door distal to said at least one hinge to prevent said cargo lid door from completely separating from the vehicle when said cargo lid door breaks apart from said at least one hinge; and,
   said cargo lid door includes an outer shell and an inner frame defining a space therebetween, said retention cable extends above and below said inner frame between said connection to said at least one hinge and said cargo lid door for providing a redundant connection between said cargo lid door and the vehicle in addition to said hinge when said cargo lid door is open or closed.

2. The retention cable arrangement according to claim 1, wherein said retention cable is substantially co-planar with said cargo door along its entire axial extent.

3. The retention cable arrangement according to claim 2, wherein said cable includes looped end connectors at opposite ends through which fasteners are received to connect said cable to, respectively, said door and said hinge.

4. The retention cable arrangement according to claim 2, further including another hinge spaced from said at least one hinge, said retention cable is fixedly secured to said another hinge.

5. The retention cable arrangement according to claim 4, wherein said at least one hinge is a gooseneck hinge.

6. The retention cable arrangement according to claim 5, wherein said retention cable connects to said at least one hinge along a portion of said goose neck hinge is co-planar with said cargo door.

7. The retention cable arrangement according to claim 1, wherein said outer shell is formed from a material selected from the group consisting of thermoplastic, and sheet molded compound.

8. The retention cable arrangement according to claim 1, wherein said retention cable is connected adjacent to an edge of said cargo lid door distal to said at least one hinge.

9. The retention cable arrangement according to claim 7, wherein said retention cable is connected to said cargo lid door adjacent to a latch of said cargo lid door.

10. A mounting arrangement for a retention cable in association with a vehicle, comprising:
    a closure having a hinge for connecting said closure to the vehicle;
    a retention cable connected to said hinge and to said closure at a location spaced from said hinge;
    said retention cable is substantially co-planar with said closure along an entire extent of said retention cable; and,
    said closure includes an outer shell and an inner frame defining a space therebetween, said retention cable extends above and below said inner frame between said connection to said at least one hinge and said closure for providing a redundant connection between said closure and said vehicle in addition to said hinge when said closure is open or closed.

11. The mounting arrangement of claim 10, wherein said location is distal to said hinge and spaced apart along said closure from a latch that selectively locks said closure closed to the vehicle.

12. The mounting arrangement of claim 10, wherein said closure is disposed over a cargo compartment and is selectively openable to provide access to said cargo compartment.

13. The mounting arrangement of claim 12, wherein said cargo compartment is disposed in a floor of a load-carrying bed.

14. The mounting arrangement of claim 10, wherein said location is adjacent to a back edge of said closure.

15. The mounting arrangement of claim 10, further including a second hinge, said cable connected to said second hinge.

16. A closure retention arrangement for a vehicle closure assembly, comprising:
    a plastic closure having a hinged connection including two hinges connecting said closure to a body of the vehicle;
    a cord substantially co-planar with said closure;
    said cord having a first connection to said hinged connection and a second connection to said closure, said second connection spaced from said hinged connection;
    said cord having a strength sufficient to retain said closure to said body should said plastic closure break from said body at said hinged connection; and,
    said cord includes a first portion and a second portion, said first portion fixedly connected to one of said two hinges and said second portion fixedly connected to another of said two hinges for providing a redundant connection between said closure and said vehicle in addition to said hinged connection when said closure is open or closed.

17. The closure retention arrangement according to claim 16, wherein said cord is a cable including a minimum breaking strength of 1200 kilograms per foot.

18. The closure retention arrangement according to claim 16, wherein said closure is a cargo lid door.

19. A closure retention arrangement for a vehicle closure assembly, comprising:
    a closure having a frame and a connection securing said frame to a body of the vehicle;
    a cord substantially co-planar with said closure; and,
    said cord having a first attachment to said connection, a second attachment to said closure and a portion between said first and second attachments weaving through said frame to restrict inadvertent movement between said closure and said body of said vehicle if said closure separates from said connection when said closure is in a closed position and when said closure is in an open position, said second attachment spaced from said first attachment.

20. The closure retention arrangement according to claim 19, wherein said closure includes an outer shell in addition to said frame, said outer shell and said frame defining a space therebetween, said portion cord extends above and below said frame in weaving through said frame.

21. A mounting arrangement for a retention cable in association with a vehicle, comprising:
    a cargo door having a pair of hinges for connecting said cargo door to the vehicle;
    a retention cable having a first portion and a second portion;
    said first portion connected to one of said hinges and to said cargo door at a location spaced from said hinges;

said second portion connected to the other of said hinges and to said cargo door at a location spaced from said hinges;

said first portion and said second portion of said cable each substantially coplanar with said cargo door during closing and opening of said cargo door; and, said cargo door includes an outer shell and an inner frame defining a space therebetween, said retention cable extends above and below said inner frame to at least one hinge and said cargo door for restricting inadvertent movement between said cargo door and said vehicle if said cargo door separates from said hinges when said cargo door is in a closed position and when said cargo door is in an open position.

* * * * *

UNITED STATES PATENT AND TRADEMARK OFFICE
CERTIFICATE OF CORRECTION

| | | |
|---|---|---|
| PATENT NO. | : 7,374,221 B2 | Page 1 of 1 |
| APPLICATION NO. | : 11/272388 | |
| DATED | : May 20, 2008 | |
| INVENTOR(S) | : Kerry S. McClure et al. | |

It is certified that error appears in the above-identified patent and that said Letters Patent is hereby corrected as shown below:

In claim 9, at Column 5, line 48, replace "claim 7" with --claim 8--.

Signed and Sealed this

Twenty-ninth Day of July, 2008

JON W. DUDAS
*Director of the United States Patent and Trademark Office*